J. D. GIBBS.
RAILWAY PASS.
APPLICATION FILED JULY 19, 1917.

1,274,032.

Patented July 30, 1918.

NEW YORK & SAN FRANCISCO RAILWAY CO.
1917 No. 383
PASS A
ACCOUNT
BETWEEN ALL STATIONS
UNTIL DECEMBER 31st, 1917 { UNLESS OTHERWISE ORDERED AND SUBJECT TO CONDITIONS ON BACK
GENERAL MANAGER

No. 383
Address C
Requested by
Date Issued
(Jan. 1, 1917, unless otherwise noted)
Issued by
Remarks

NEW YORK & SAN FRANCISCO RAILWAY CO.
1917 No. 384
PASS A
ACCOUNT
BETWEEN ALL STATIONS
UNTIL DECEMBER 31st, 1917 { UNLESS OTHERWISE ORDERED AND SUBJECT TO CONDITIONS ON BACK
GENERAL MANAGER

No. 384
Address C
Requested by
Date Issued
(Jan. 1, 1917, unless otherwise noted)
Issued by
Remarks

NEW YORK & SAN FRANCISCO RAILWAY CO.
1917 No. 384
PASS A
ACCOUNT
BETWEEN ALL STATIONS
UNTIL DECEMBER 31st, 1917 { UNLESS OTHERWISE ORDERED AND SUBJECT TO CONDITIONS ON BACK
GENERAL MANAGER

NEW YORK & SAN FRANCISCO RAILWAY CO.
1917 No. 385
PASS A
ACCOUNT
BETWEEN ALL STATIONS
UNTIL DECEMBER 31st, 1917 { UNLESS OTHERWISE ORDERED AND SUBJECT TO CONDITIONS ON BACK
GENERAL MANAGER

No. 385
Address C
Requested by
Date Issued
(Jan. 1, 1917, unless otherwise noted)
Issued by
Remarks

NEW YORK & SAN FRANCISCO RAILWAY CO.
1917 No. 385
PASS A'

ALPHABETICAL RECORD
OF ANNUAL PASS.-N.Y.& FRISCO R.Y.
1917
ISSUED TO

UNTIL DEC. 31 1917 UNLESS OTHERWISE ORDERED

No. 386
Address C
Requested by
Date Issued
(Jan. 1, 1917, unless otherwise noted)
Issued by
Remarks

NUMERICAL RECORD
OF ANNUAL PASS,-N.Y.& FRISCO R.Y.
1917
ISSUED TO

UNTIL DEC, 31 1917 UNLESS OTHERWISE ORDERED

No. 387
Address C
Requested by
Date Issued
(Jan. 1, 1917, unless otherwise noted)
Issued by
Remarks Witnesses:

Inventor
James D. Gibbs

UNITED STATES PATENT OFFICE.

JAMES D. GIBBS, OF LOUISVILLE, KENTUCKY, ASSIGNOR TO GIBBS-INMAN COMPANY, OF LOUISVILLE, KENTUCKY.

RAILWAY-PASS.

1,274,032.  Specification of Letters Patent.  Patented July 30, 1918.

Application filed July 19, 1917. Serial No. 181,503.

*To all whom it may concern:*

Be it known that I, JAMES D. GIBBS, a citizen of the United States, residing at Louisville, in the county of Jefferson and State of Kentucky, have invented new and useful Improvements in Railway-Passes, of which the following is a specification.

My invention relates to the class of railway transportation known as annual passes, which have heretofore been of the form of separate cards, approximately two and one half by four inches and having rounded corners.

These passes require to be made out in triplicate, an original or pass proper, and two duplicates for alphabetical and numerical record cards, and the duplicates require additional pass record matter to be printed thereon.

I have found that it is exceedingly difficult to handle the cards individually in a typewriter and it has been proposed to provide a frame or holder into which the card constituting the pass proper would be inserted and the same assembled with loose record sheets and interposed carbon sheets and placed in the typewriter in the same manner as ordinary sheets of paper.

Such an arrangement has proved impracticable owing to the time and care required to insert this pass proper into the holder, and the difficulty of securing proper alinement of the superposed sheets.

The present invention aims to provide a construction and arrangement of assembled pass and record blanks which may be readily inserted in a typewriting machine without the use of any holder or frame, in which the blanks will be maintained in proper alinement, and in which the matter constituting the pass proper and also the additional record matter may be simultaneously written upon superposed sheets.

My invention is illustrated in the accompanying drawing in which,

Figure 1 is a full face view of a full sheet embodying five passes, and showing the pass sheet and one underlying record sheet, the second underlying record sheet being hidden by the overlying record sheet.

Fig. 2 shows a single pass detached from its adjoining passes which are shown partly broken away.

In proceeding according to my invention I provide a sheet of suitable length and width divided by transverse weakened lines into a series of transverse strips A bearing pass form matter and blanks, and a binding margin B; and two underlying sheets divided by similar weakened lines to provide corresponding transverse strips constituting record portion C and binding strips at the top as shown in Fig. 1. The underlying sheets are made wider than the pass sheet A and the portions which extend beyond the edge of the pass sheet bear record matter and blanks not embraced in the pass proper and adapted to have simultaneously impressed thereon additional pass record matter.

The binding portions B may be secured together in any suitable manner which will not interfere with the passage of the assembled blanks through the typewriting machine.

To avoid any rough or ragged edges, and any sharp corners which might tend to catch or impede the free progress through the typewriting machine I make the weakened lines in the shape of elongated slits *a* between the several passes, leaving only a very narrow connection of uncut paper *b* between the slits *a* and at the end of each row of slits and connecting directly with them I use deep notches *c* having inwardly convexed sides, thus effecting perfectly round-cornered and smooth-edged passes when detached from the sheet as shown in Fig. 2.

It is my purpose to vary the width of the connecting hinges of paper *b* as the quality or texture of the sheets requires for safe passage through the typewriter and it will be seen that the narrower these hinges may be made the smoother the edges of the detached passes.

Having described my invention, what I claim is:

1. A railway pass form comprising a plurality of superposed sheets of paper detachably connected together at one extremity, the overlying sheet being of less width than the underlying sheets, said sheets bearing in superposed alinement suitable data and blanks, whereby the detachable overlying sheet constitutes a pass form and the underlying sheets constitute record forms, the extended parts of the record forms bearing record matter and blanks, not embraced in the pass proper and adapted to have simultaneously impressed thereon additional pass record matter.

2. A railway pass form comprising a plurality of superposed sheets of paper detachably connected together at one extremity, the overlying sheet being of less width than the underlying sheets, each of said sheets being divided by lateral weakened lines into a plurality of transverse separable strips, said strips bearing in superposed alinement suitable data and blanks whereby the separable strips of the overlying sheet constitute pass forms and the separable strips of the underlying sheets constitute record forms, the extended parts of the record forms bearing record matter and blanks, not embraced in the pass proper and adapted to have simultaneously impressed thereon additional pass record matter.

JAMES D. GIBBS.

Witnesses:
C. W. EAKEN,
E. P. KIMMEL.